Oct. 29, 1929.  E. R. LOCHMAN  1,733,613
COMBINATION HEADLIGHT
Filed Aug. 9, 1926  4 Sheets-Sheet 3
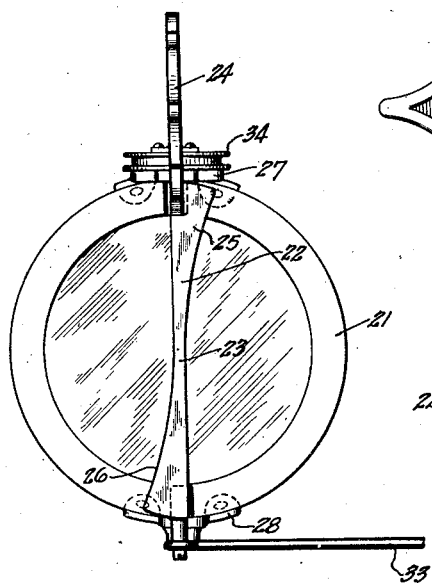
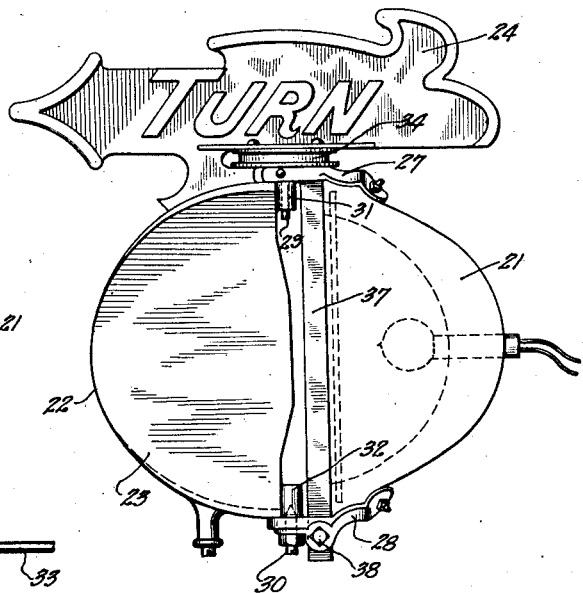
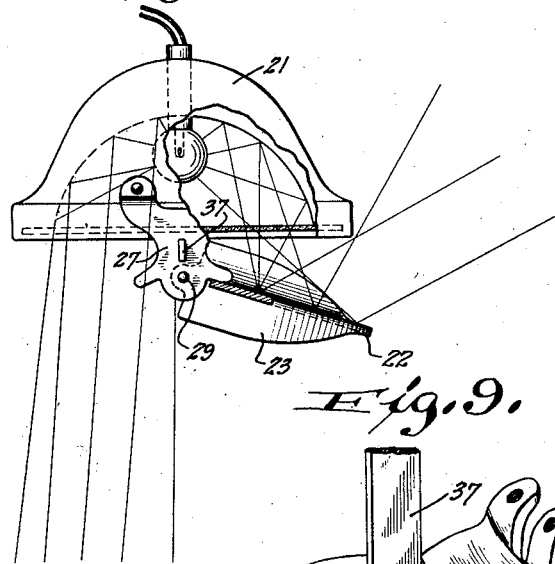
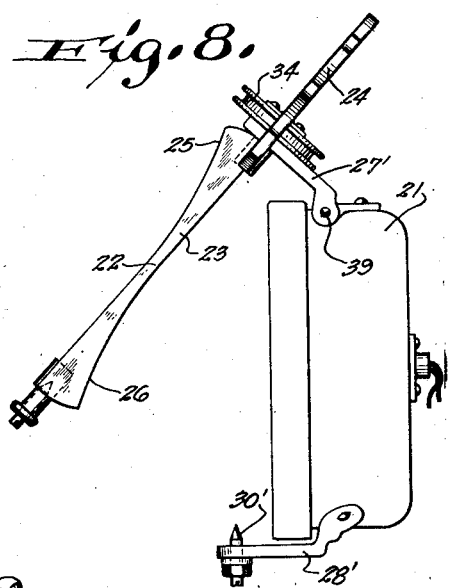
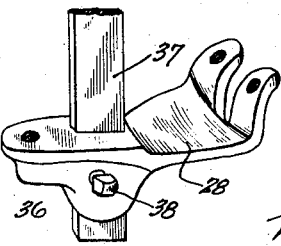
INVENTOR.
Emil R. Lochman
BY
Morsell, Keeney & Morsell
ATTORNEYS.

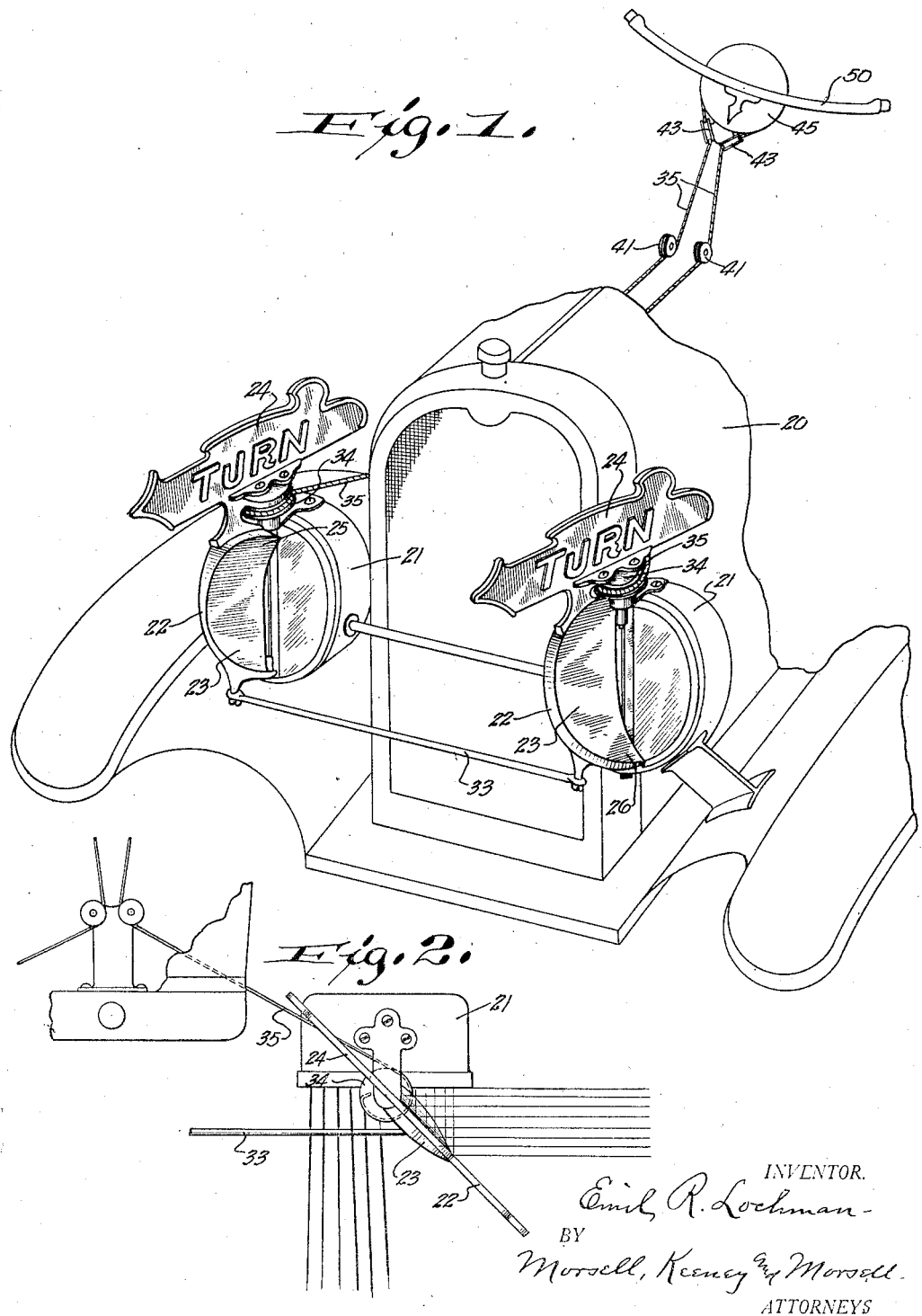

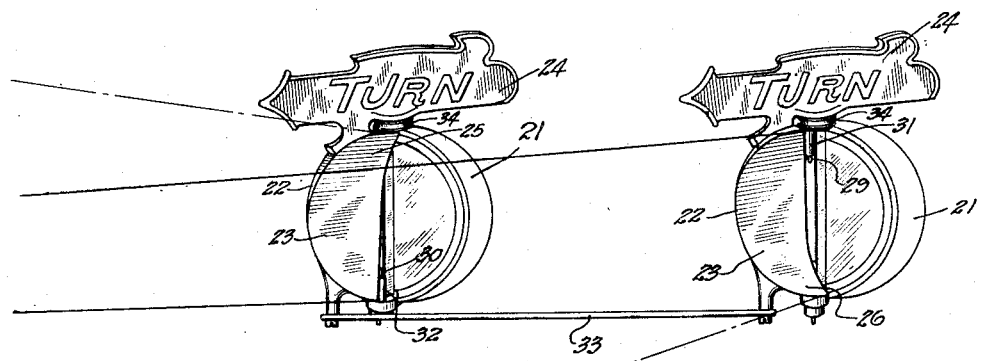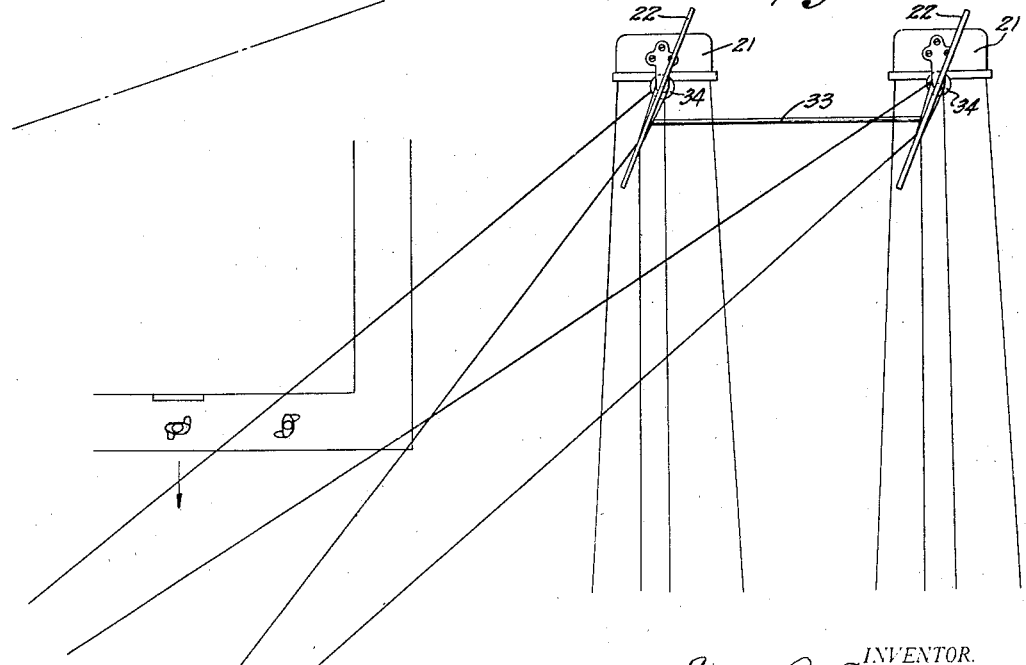

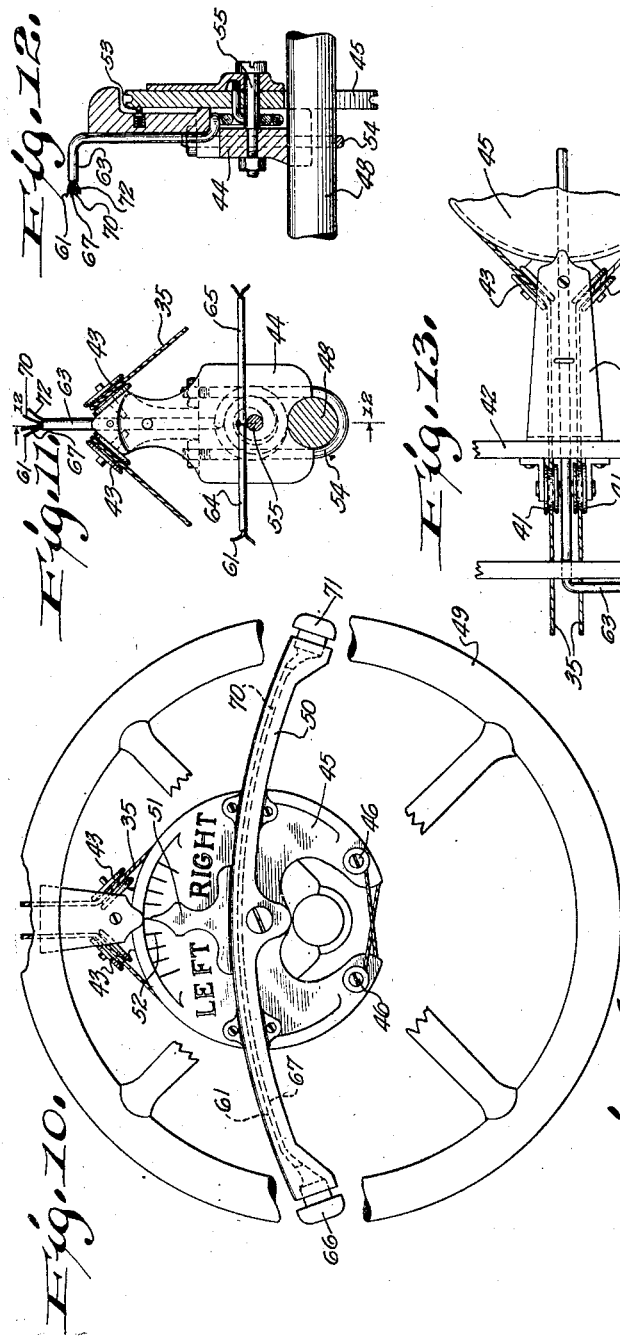

Patented Oct. 29, 1929

1,733,613

UNITED STATES PATENT OFFICE

EMIL R. LOCHMAN, OF MILWAUKEE, WISCONSIN

COMBINATION HEADLIGHT

Application filed August 9, 1926. Serial No. 128,190.

This invention relates to improvements in combination head lights, spot lights and traffic signals for motor vehicles.

The primary object of this invention is to provide a vehicle head light system having additional features and furnishing additional important services over the headlights now in use, without using additional electric current or additional lights, and increasing the safety and riding comfort and enjoyment of the vehicle.

A further object of the invention is to provide more suitable and effective means and devices than are now in use for giving warning signals by the driver of a vehicle to others of the intended movements of the vehicle so equipped, thereby increasing the safety of the vehicle in traffic.

A further object of the invention is to provide an effective, very handy and easily operated light controlling device suitably mounted below the vehicle steering wheel, so that it may be easily operated by the vehicle driver without removing his hands from the steering wheel, contact buttons for the horn and headlights also being attached thereto so that it will not require the removal of the operators' hands from the steering wheel for either sounding the horn or operating the light and direction signals.

A further object of the invention is to provide a combination light and sign signal operatively mounted for joint action, giving easily recognizable signals for both day and night driving.

A further object of the invention is to so arrange and equip the head lights of a vehicle that they may serve as spot lights, thereby eliminating the need of additional spot lights and the extra manipulation required in spotting an object with the same.

A further object of the invention is to provide adjustable head lights having a permanent up and down focus to direct a powerful and continuous up and down stream of light in any direction.

A further object of the invention is to provide a head light device for use in night driving and arranged to divert a section of the light rays to any angle to light up the side portions of the road to render signs and side roads visible, said arrangement, however, keeping a portion of the light rays from being diverted, whereby the road ahead remains illuminated.

A further object of the invention is to provide a combination head light, spot light and traffic signal with which any motor vehicle may be readily equipped, and which is neat and attractive in appearance.

A further object of the invention is to provide a combination head light, spot light and traffic signal, which is of very simple construction, is strong and durable and easily operated, and is well adapted for the purpose set forth.

With the above and other objects in view the invention consists of the improved combination head light, spot light and traffic signal for vehicles, and its parts and combinations are set forth in the claims and all equivalents thereof.

In the accompanying drawing in which the same reference characters indicate the same parts in all of the views;

Fig. 1 is a perspective view of the device and the parts of an automobile to which it is related, the sign reflectors being shown in a straight position;

Fig. 2 is a plan view of a head light with the sign reflector turned outwardly at a forty-five degree angle, showing the direction of the light rays, part of the operating means of the sign reflectors also being shown;

Fig. 3 is a perspective view of the head lights with the sign reflectors turned at an angle to the left and illustrating the effect of the reflectors;

Fig. 4 is a plan view of the head lights with the sign reflectors turned at an angle to the left and showing a use of the sign reflectors;

Fig. 5 is a front view of a headlight with the sign reflector in normal positon;

Fig. 6 is a side view thereof;

Fig. 7 is a plan view of the head light with the sign reflector turned to an extreme outer position and showing the light reflecting effect, part of the head light being broken away;

Fig. 8 is a side view of a "drum" type of head light showing the form of a sign reflector used in connection therewith;

Fig. 9 is a detail view of a bracket for connecting the lower portion of the sign reflector to the type of head light shown in Figs. 5, 6 and 7;

Fig. 10 is a plan view of the controlling apparatus for the device;

Fig. 11 is a detail plan view of the steering post mounting bracket, showing part of the electric wiring;

Fig. 12 is a cross sectional view taken on line 12—12 of Fig. 11;

Fig. 13 is a fragmentary plan view showing part of the controlling apparatus for the device;

Fig. 14 is an enlarged detail view of the means for adjusting the tension of the wire cables used in operating the sign reffectors; and Fig. 15 is a side view of the controlling apparatus as mounted on the steering post and in proper relation to the steering wheel, instrument board, vehicle casing and hood, the wiring arrangement from the controlling apparatus to the horn and head lights also being shown.

Referring now more particularly to the drawings it will appear that the numeral 20 indicates a motor vehicle having the usual head lights 21 which may be either of the drum or cone type.

Each head light is fitted with what is termed as a sign reflector 22 comprising a reflector portion 23 and a sign portion 24, formed either integral or of separate members or castings suitably joined.

The sign portions 24 are ornamental in appearance and bear suitable warning indicia, as the word "Turn." Said signs are also sufficiently long and balanced so that wind pressure thereon will be equalized.

The reflector portions 23 are vertically disposed and each has a pair of opposed concave surfaces, covered with rust proof steel, or any other suitable material. Head light reflectors now in common use are made of brass and are silver plated with the result that they do not stand exposure, dust or handling. Hence, the material used in the exposed reflector is of great importance and for that reason rust proof steel, which is weather proof and has reflecting qualities is preferably used. The curvature of the inner reflectors is such that the upper portions are pitched more than the lower portions, as indicated at 25, while the lower portions of the outer reflectors have a greater pitch, as at 26, the result being that when the sign reflectors are turned, light will be thrown upwardly from one reflector and downwardly from the other, as shown in Fig. 3.

Each sign reflector is connected to its head light by means of an upper bracket 27 and a lower bracket 28 which will be referred to more in detail hereinafter, and the sign reflectors are pivotally mounted with respect to the brackets and the pivotal mounting preferably being effected by means of pivot pins 29 and 30 journaled in bearing positions 31 and 32, projecting from the inner edges of the reflector portions. To insure simultaneous and joint movement of the sign reflectors, the lower portions of the same are pivotally joined by a rod 33. The upper portion of each sign reflector carries a fixed pulley 34, about which is wound and secured the end portion of a thin wire cable 35.

It is necessary that the sign reflectors be movable to permit access to the front portion of the lights for adjustments and bulb replacements and to that end several forms of brackets for attaching sign reflectors to the head lights have been illustrated in Figs. 5, 6, 7, 8 and 9, it being possible to use different forms of brackets with the ordinary cone type of headlight than with the drum type headlight. With the cone type of light, the upper and lower brackets designated 27 and 28 and shown in Figs. 5, 6, 7 and 9 are used, said brackets being attached to the light by set screws engaging the flanged portion of the light casing. The lower bracket 28, is formed with a slot 36 to receive the end portion of a bar 37 which depends from the upper bracket 27 and is held in position by a screw 38, the bar serving as a means for holding the reflector and brackets together as a unit, when mounted on the headlight. If access to the headlight is desired the sign reflector may be removed by loosening the set screw 38 to permit the withdrawal of the bracket 28 and then loosening the small set screws in the flanges of the upper bracket, and then removing the reflector, bracket, and bar 37 as a unit.

The type of reflector sign mounting shown in Fig. 8 includes upper and lower brackets 27' and 28' permanently attached to the body of the light by rivets or screws. The upper bracket is pivoted, as at 39 and the reflector member 22 is fixed to said bracket. Normally it is pivotally secured to the lower bracket 28' by means of an adjustable cone pointed set screw 30' and when the reflector is turned to one side and the set screw adjusted, the device may be bodily moved, as shown, whereby access to the front of the light is afforded.

As mentioned, the sign reflectors are operated jointly by a cable 35 wound on the pulleys 34. Said cable is run under the corner portion of the hood on each side, as shown in Fig. 1 and is then extended rearwardly through the partition 40 and over a pair of pulleys 41 (see Figs. 13 and 14) mounted on the instrument board or cowl 42. The cables then extend through member 42 and diverge, passing over a pair of pulleys 43 secured to a bridge member 44. The cables are extended around opposite side of a grooved drum or dial sheave 45 and the end portions are secured thereto.

As shown in Figs. 10 and 14, the end portion of each cable 35 is run through an apertured bolt 46 in the drum or dial sheave which affords means for adjusting the tension of the cables and positioning the sign reflectors, this being accomplished by loosening the nut 47 and turning the bolt to wind or unwind the cable portion thereon.

The drum or dial sheave 45 is formed with a cut out portion to permit its being revolubly mounted on the steering post 48 of the vehicle directly below the steering wheel 49 and secured to the face of the drum is an operating lever 50 which has fixed thereto, intermediate its ends, an indicator or pointer 51, adapted to register with markings 52 delineated on the face of the drum. When the lever is turned, the pointer and markings will show the number of degrees right or left that the sign reflectors have been turned. Normal position of the drum is maintained by a spring urged plunger 53 adapted to seat in a slight recess in the under surface of the drum, the plunger being mounted in the bridge member 44.

Said bridge member extends from the instrument board 42 to the steering post 48, and is connected to the steering post by means of a U-bolt 54. The drum is pivotally secured to the bridge member by a pivot bolt 55.

Included with the apparatus is an electric horn 56 of conventional form and conveniently located. The horn receives electric current from the vehicle storage battery 57 by means of a circuit wire 58 between the battery terminal 59 and the horn binding post 60. The other circuit wire 61 extends from the battery terminal 62 and through a cable 63 which enters the bridging member 44 and is coiled about. Said coil allows pivotal motion for the dial sheave and its lever without requiring the use of sliding contacts for the circuit wires. The cable, leaving the upper portion of the member 44, diverges into a pair of oppositely extending cables 64 and 65, and carried in one of said cables, as 64, is the wire 61 which terminates at a button switch 66 at one end of the lever 50. Another circuit wire 67 extends from said button switch 66 through the cables 64 and 63 to the other binding post 68 of the horn 56. Thus, the horn is operable by means of the convenient button switch at one end of the lever 50 and is intended to be sounded during the daytime to indicate the driver's intention of making a turn, and just prior to the manipulation of the sign reflectors.

It is contemplated that the head lights may be flashed for signaling purposes at dusk, or before the bright lights of the vehicle are in use and to that end the lights are included in an auxiliary circuit by means of the wires 69 and 70, wire 69 extending directly from the battery terminal 59, while wire 70 extends through the cables 63 and 65 to a button switch 71 located at the end of the lever 50 opposite switch 66. A wire 72 also leads from the switch 71 through the cables 63 and 65 and terminates at the battery terminal 62.

The apparatus is susceptible of a number of uses before mentioned. When driving during the day time, if the driver intends to make a turn, he will first sound a warning on the horn and then turn the lever 50 in the direction he intends to turn. Through the cables this movement will be communicated to the sign reflectors and the same will be turned and point in the desired direction, serving as a notice and warning to approaching vehicles and pedestrians. At dusk, the warning is given by means of the lights being flashed, as before mentioned. The apparatus, however, is especially useful in night driving when the lights are used. Warning is given of an intention to turn by the angular reflection of lights rays in the desired direction by the reflectors. This is done without diverting all of the light rays from straight ahead, as usually more than half of the light from each head light remains undiverted, this effect being shown in Figs. 2 and 4. Also, the reflectors may be set at an angle to locate cross roads, objects or signs at the side of the road and to signal at railroad crossings by flashing the reflectors back and forth.

The upwardly and downwardly reflected streams of light, from the head lights, as shown in Fig. 3, always merge at any distance and form a unitary stream of light. When the reflectors are set straight ahead the normal light streams from the head lights are not affected, said head light streams being about three feet six inches high. As the reflectors sweep sidewise the merged light streams caused by them spread and sweep upwardly, so that at a distance of about twenty feet, and with the reflectors thrown at an angle of about thirty-five degrees this merged stream of light reaches a height of about twelve feet from the ground, and the height increases with the distance and the sidewise diverted angle to which the reflectors are thrown, so that at a height of from twenty to twenty-five feet the light stream is still effective.

The sidewise reflected streams of light from the head lights, as shown in Fig. 4, are not parallel. The reflectors are set so that the two light streams merge and are then permanently held by the rod 33. Consequently the two streams of light from the reflectors merge about eight feet in front of the head lights and continue merged at any distance and at any position (excepting when the reflectors are set straight ahead) within the reach of this reflected light.

From the foregoing description it will be seen that the improved combination head light, spot light and traffic signal is of simple and novel construction and is well adapted for the purposes described.

What I claim as my invention is:

1. In combination, a headlight, a reflector, means pivotally supporting said reflector in a substantially vertical position in front of said headlight, the reflector being formed with a pair of opposite reflecting surfaces, one so shaped as to throw a beam of light downwardly to illuminate the side of the road and the other being so shaped as to throw a beam of light upwardly to provide spot light illumination, a signal indicating "Turn" when viewed from either side, said pivotal supporting means including means for mounting the signal above the headlight in the plane of the reflector so as to move with the latter.

2. In combination with a pair of headlights having the usual stationary reflectors and lights, a pair of movable reflectors, means for pivotally supporting one of said movable reflectors in a substantially vertical position in front of each of said headlights, said movable reflectors each being formed with reflecting surfaces on opposite sides, one so shaped as to throw a beam of light downwardly to illuminate the side of the road, and the other so shaped as to throw a beam of light upwardly a substantial distance, both beams of light collectively providing road and spot light illumination, a pair of signal signs reading alike when viewed from either side, said pivotal supporting means including means for mounting a signal sign above each headlight in the plane of the reflector so as to move with the latter.

3. In combination, a headlight, a reflector, means pivotally supporting said reflector in a substantially vertical position in front of said headlight, the reflector being formed with a pair of opposite reflecting surfaces, one so shaped as to throw a beam of light downwardly to illuminate the side of the road and the other so shaped as to throw a beam of light upwardly to provide spot light illumination.

4. In combination, a headlight, a reflector, means pivotally supporting said reflector in a substantially vertical position in front of said headlight, the reflector being formed with a pair of opposite reflecting surfaces, one so shaped as to throw a beam of light downwardly to illuminate the side of a road and the other so shaped as to throw a beam of light upwardly to provide spot light illumination, a signal sign, said pivotal supporting means including means for mounting said signal sign above the headlight in the plane of the reflector so as to move with the latter, said reflector and headlight being adapted to jointly illuminate said signal sign.

5. In combination with a pair of headlights having the usual stationary reflectors and lights, a pair of movable reflectors, means for pivotally supporting one of said movable reflectors in a substantially vertical position in front of each of said headlights, said movable reflectors each being formed with reflecting surfaces on opposite sides, one so shaped as to throw a beam of light downwardly to illuminate the sides of the road, and the other so shaped as to throw a beam of light upwardly a substantial distance, both beams of light collectively providing road and spot light illumination.

6. A headlight attachment comprising a bar, brackets at each end of the bar having portions on opposite sides thereof, the portions at one side of the bar being formed to cooperate with the lens end of a headlight casing, a reflector, means pivotally connecting said reflector between the bracket portions on the other side of said bar, said bar and one of said brackets including means permitting adjustment of said one bracket in the longitudinal direction of said bar.

7. A headlight attachment comprising a bar, brackets at each end of the bar having portions on opposite sides thereof, the portions at one side of the bar being formed to cooperate with the lens end of a headlight casing, a reflector, means pivotally connecting said reflector between the bracket portions on the other side of said bar, a signal and sheave, said pivotal connecting means being adapted for mounting said signal above the headlight and said sheave between said signal and said reflector, for the joint pivotal motion of said parts.

8. A headlight attachment comprising a bar, brackets at each end of the bar having portions on opposite sides thereof, the portions at one side of the bar being formed to cooperate with the lens end of a headlight casing, a reflector, means pivotally connecting said reflector between the bracket portions on the other side of said bar, means permitting sliding adjustments of one of said brackets longitudinally of said bar, and means for securing said one bracket at any adjusted position on said bar.

9. A signal operating attachment for automobiles, comprising a supporting member, having a recess in its edge to receive a steering column, means cooperating with the recess for clamping the member to a steering column, a dial sheave having a re-entrant recess, means pivotally mounting said dial sheave on said supporting member with its axis adjacent to and parallel with the wall of the recess in said supporting member, said dial sheave being provided with cable fastening means near its periphery and on opposite sides of said recess, and operating means rigid with and extending radially from and parallel to, said dial sheave.

10. A signal operating attachment for automobiles, comprising a supporting member having a recess in its edges to receive a steering column, means cooperating with the recess for clamping the member to a steering column, a dial sheave having a re-entrant recess and a bolt hole, a bolt extending through said dial sheave bolt hole and having an aperture adjacent its head, said bolt serving to pivotally mount said dial sheave on said supporting member with its axis adjacent to and parallel with the wall of the recess in said supporting member, said dial sheave being provided with cable fastening means near its periphery and on opposite sides of said recess, and operating means rigid with and extending radially from and parallel to, said dial sheave.

11. A signal operating attachment for automobiles, comprising a supporting member having a recess in its edge to receive a steering column, means cooperating with the recess for clamping the member to a steering column, a dial sheave having a re-entrant recess, means pivotally mounting said dial sheave on said supporting member with its axis adjacent to and parallel with the wall of the recess of said supporting member, said dial sheave being provided with cable fastening means near its periphery and on opposite sides of said recess, and operating means rigid with and extending radially from and parallel to, said dial sheave, said supporting member carrying a pair of pulleys adjacent a portion of the dial sheave and positioned on the opposite side of the pivotal mounting from said recess.

12. The combination with a motor vehicle having a pair of headlights, a pair of reflectors, means for pivotally mounting a reflector substantially vertically and centrally in front of each headlight, means rigidly connecting said reflectors for parallel movement, a substantially horizontal sheave rigidly connected with each reflector, cable directing pulleys mounted on said vehicle in position to guide said cable rearwardly thereof, a dial sheave, means pivotally mounting said dial sheave adjacent to the driver's position, said dial sheave being provided at spaced portions of its periphery toward the rear of the vehicle with cable fastening means, a cable having a portion of a turn around one of said reflector sheaves leading over said directing pulleys around one portion of the dial sheave to one of said fastening means, and a second cable having a portion of a turn around the other reflector sheave in opposite direction from that of the first sheave and leading over other directing pulleys to the opposite position of the dial sheave and its corresponding fastening means.

13. The combination with a motor vehicle, having headlights, an instrument board, a steering column, and steering wheel of reflectors pivotally mounted in front of said headlights, a wiring bridge between the steering column and the instrument board, means including fastening devices at one end of the bridge for supporting the latter on the instrument board, means including fastening devices on the other end for securing it to the steering column, operating means for said reflectors pivotally mounted on said wiring bridge, a switch on said operating means, circuit wires connected to said switch, and cables for moving said reflectors extending from the steering column to the instrument board in such relation to the bridge that they are covered and protected thereby.

14. The combination with a motor vehicle, having headlights, an instrument board, a steering column and steering wheel, of reflectors pivotally mounted in front of said headlights, a wiring bridge between the steering column and the instrument board, said wiring bridge comprising a pair of members meeting at an angle to each other, and means for detachably connecting said bridge members together at their meeting portions, means including fastening devices at one end of the bridge for supporting the latter on the instrument board, means including fastening devices on the other end for securing it to the steering column, operating means for said reflectors pivotally mounted on said wiring bridge, a switch on said operating means, circuit wires connected to said switch, and cables for moving said reflectors extending from the steering column through the instrument board in such relation to the bridge that they are covered and protected thereby.

15. In a signal operating device, a supporting member, a dial sheave, means pivotally mounting said dial sheave on said supporting member, said dial sheave and said supporting member being so shaped as to form a space between them, and said dial sheave being provided with an aperture adjacent to the pivotal mounting and the supporting member also having an aperture, both apertures communicating with said space, an operating member having a tubular portion and a flattened portion provided with a groove communicating with the tubular portion, means detachably securing said operating member to said dial sheave with the groove over the dial sheave aperture, a switch mounted in the end of the tubular portion, and wires extending from said switch through said tubular portion and said groove through the aperture in the dial sheave and forming a coil in said space around said pivotal mounting and out through the aperture in said supporting member.

16. In a signal operating device, a supporting member, a dial sheave, means pivotally mounting said dial sheave on said supporting member, said dial sheave and said supporting member being so shaped as to form a space between them, and said dial sheave being provided with an aperture adjacent the pivotal mounting and the supporting member also having an aperture, both apertures communicating with said space, an operating member having a tubular portion and a flattened portion provided with a groove communicating with the tubular portion, said flattened portion being formed with an indicator extension, said dial sheave having graduations thereon, and said supporting member having an indicating portion, all of which cooperate, means detachably securing said operating member to said dial sheave with the groove over the dial sheave aperture, a switch mounted in the end of the tubular portion, and wires extending from said switch through said tubular portion and said groove through the aperture in the dial sheave and forming a coil in said space around said pivotal mounting and out through the aperture in said supporting member.

17. In combination with a headlight, a movable sign and reflector, both of which are pivotally mounted in a central vertical position in front of the headlight, said pivotal mounting means including means for mounting the signal above the headlight in the plane of the reflector, so as to move with the latter, the reflector and a portion of the sign extending forward of the headlight and a portion of the sign extending rearwardly over the headlight.

18. The combination with a motor vehicle having headlights, a horn, a steering column and steering wheel, of reflectors, means pivotally mounting said reflectors in front of said headlights, reflector moving means including cables extending from said reflector pivotal mounting means and operating means, means pivotally mounting said operating means adjacent to and in a plane underneath said steering wheel for movement in a plane parallel thereto, said operating means including a lever having arms extending in opposite directions with their ends adjacent to the steering wheel rim, push button switches mounted on the ends of said arms, wires extending from one button switch to operate said horn, and shunt circuit wires extending from the other button switch to the headlights.

19. The combination with a motor vehicle having headlights, a steering column and steering wheel, of reflectors, means pivotally mounting said reflectors in front of said headlights, reflector moving means including cables extending rearwardly from said pivotal reflector mounting means, and a lever pivotally associated with the steering column and normally extending at right angles to the longitudinal axis of the vehicle and terminating adjacent the rim of the steering wheel for convenient operation therewith, said cables being connected with said lever.

20. In combination, a headlight, a reflector, means pivotally supporting said reflector in a substantially vertical position in front of said headlight, the reflector being formed with a pair of opposite reflecting surfaces, a signal indicating "Turn" when viewed from either side, said pivotal supporting means including means for mounting the signal above the headlight in the plane of the reflector so as to move with the latter.

21. In combination, a pair of headlights, a reflector carried by each headlight, connected means pivotally supporting said reflectors in substantially vertical positions in front of their respective headlights, each reflector being formed with a pair of opposite reflecting surfaces, one so shaped as to throw a beam of light upwardly and the other so shaped as to throw a beam of light downwardly, the light beams from one reflecting surface of each reflector merging at a point a relatively short distance from said reflectors when said reflectors are diverted at an angle from straight ahead.

In testimony whereof, I affix my signature.

EMIL R. LOCHMAN.